United States Patent [19]
Shaffer et al.

[11] Patent Number: 5,512,743
[45] Date of Patent: Apr. 30, 1996

[54] SPACE-BASED ASTEROID DETECTION AND MONITORING SYSTEM

[75] Inventors: William A. Shaffer, Gaithersburg; Martin J. McHugh, Baltimore, both of Md.; Dexter Wang, Concord, Mass.

[73] Assignee: The United States of America as represented by the Secretary of the Navy, Washington, D.C.

[21] Appl. No.: 186,075

[22] Filed: Jan. 25, 1994

[51] Int. Cl.$^6$ ................................................. G01C 21/02
[52] U.S. Cl. ................................ 250/203.6; 250/208.1
[58] Field of Search .......................... 250/203.6, 203.1, 250/208.1; 356/3.1, 3.11, 4.01; 244/158 R

[56] References Cited

U.S. PATENT DOCUMENTS

| | | | |
|---|---|---|---|
| 3,912,398 | 10/1975 | Zenk | 250/203.6 |
| 4,330,705 | 5/1982 | Kollodge | 250/203.6 |
| 4,740,681 | 4/1988 | Tsuno | 250/203.6 |
| 5,177,686 | 1/1993 | Böinghoff et al. | 250/203.6 |
| 5,223,702 | 6/1993 | Conley | 250/203.6 |

OTHER PUBLICATIONS

W. A. Shaffer et al., Asteroid Detection and Monitoring Using a Satellite–Borne Visible Scanner, Naval Research Laboratory Formal Report 5621—93-9538 (Jan. 15,1993).

A. P. Schaum, Dual Difference Filtering: A Replacement for Interpolation and Subtraction to Detect Changes in Misregistered Signals, Naval Research Laboratory Formal Report 5620—92-9522 (Nov. 30, 1992).

Memorandum dated Dec. 3,1993, from D. C. Moultrie to "Code 3008.2 (Mr. Miles), re NRL Formal Report #9538."

*Primary Examiner*—Edward P. Westin
*Assistant Examiner*—Steven L. Nichols
*Attorney, Agent, or Firm*—Thomas E. McDonnell; Edward F. Miles

[57] ABSTRACT

A satellite-borne system for the detection of near earth objects. The system periodically captures two images of the celestial sphere about the earth using a pair of linear arrays of optical detectors oriented so that the detectors image lines on the celestial sphere that are separated at each pixel in azimuth by the same angle. The position of the linear detectors is varied for each orbit of the earth by the satellite such that the entire celestial sphere can be imaged. The images produced by the two detector arrays are temporarily stored in memory until they can be processed using frame difference signal processing techniques. The results from the frame difference signal processing are transmitted to a ground station for further processing. The processing on the ground can include object classification, orbit tracking (using a time sequence of differenced frames), and earth collision determination and warning.

10 Claims, 3 Drawing Sheets

SPACE-BASED ASTEROID DETECTION AND MONITORING SYSTEM

BACKGROUND OF THE INVENTION

1. Field of the Invention

The present invention relates to satellite-borne visible scanners. More particularly, this invention relates to a device designed to continuously monitor the celestial sphere for near earth objects.

2. Description of the Related Art

The earth is continually bombarded by asteroids and comets, most of which are harmlessly burned in the atmosphere. However, a fraction of these objects do impact the earth's surface, as evidenced by the many craters found around the globe. Such collisions of planetary bodies with the earth have played an important role in the geological, biological and climatological development of the earth. Asteroid collisions may have had a significant impact on biological evolution as a result of mass extinctions brought on by global climate change.

The destructive power of asteroid collisions has also been demonstrated in modern times. The 1908 Tunguska meteorite, the 1947 Sikhote-Alin meteorite and the 1945 meteor explosion over the pacific ocean all released energies equivalent to small thermonuclear devices. A near hit of an asteroid with the earth in 1991 underscores the vulnerability of our planet to sudden devastation.

Over 200 Near Earth Asteroids (NEAs) have been discovered. The Aten and Apollo class asteroids have earth intersecting orbits. While NEAs are usually smaller than 5 kilometers in diameter, asteroids as small as 50 meters in diameter pose a potential threat for significant destruction should one collide with the earth. NEAs are believed to arise from the decay of cometary nuclei or from ejection from the main asteroid belt.

To better comprehend the nature and magnitude of risks associated with collisions of near earth asteroids (NEAs) with the earth, a full understanding of the population of near earth objects is needed. Continuously monitoring the celestial sphere to detect near earth objects would give new insight into the distribution of asteroid sizes and orbits and would lead to a better understanding of the population of near earth objects.

Currently, ground-based telescopes are used for detecting and monitoring NEAs and other near earth objects. However, ground-based monitoring and detection schemes suffer from several limitations. For example, small objects such as NEAs with diameters of 50 meters cannot be reliably detected using ground-based telescopes. The performance of ground-based systems is affected by factors such as the sun, atmospheric turbulence, and cloud cover which limit the size and distance of the NEAs detected. Additionally, there are only enough ground-based systems to monitor a small fraction of the celestial sphere every day. Because the earth turns on its axis with a twenty-four hour period, any ground based system can examine only one latitudinal section of the celestial sphere per day. Thus ground based systems are either inherently slow, or require an unacceptably large number of telescopes. The high cost of building the many needed observatories, the great number of persons needed to operate the systems, and the limiting factors of the sun, clouds and atmospheric turbulence make the use of ground-based systems prohibitive.

SUMMARY OF THE INVENTION

Accordingly, it is an object of this invention to provide a space-based scanner for the detection and monitoring of near earth objects.

Another object of the present invention is the provision of an apparatus which will scan the celestial sphere rapidly (preferably once every twenty-four hours to detect and monitor near earth objects).

A further object of the present invention is to provide a system, which does the foregoing without a great number of persons to operate it.

Yet another object of the present invention is to provide a system to reliably detect near earth objects with diameters as small as 50 meters.

A further object of the present invention is the provision of a system to reliably detect near earth objects with diameters as small as 50 meters at a great enough distance from the earth to allow sufficient warning time of earth bound objects.

In accordance with these and other objects made apparent hereinafter, the invention concerns an apparatus and method for the detection and monitoring of near earth objects. A pair of arrays of optical detectors, preferably sensitive to wavelengths in the visible range, to image lines on the celestial sphere. The arrays are oriented so that the image lines are separated at each pixel in azimuth by the same angle, thus the two arrays produce similar images separated by a slight delay. The delay between the two images will result in parallax motion of near objects between the two images.

The images are compared using frame difference signal processing wherein the two sequences of images are resampled on a common grid and then differenced. The parallax motion of near objects results in these objects remaining in the differenced image, while fixed objects such as the star field subtract to zero in the differenced image.

The results from the frame difference signal processing are preferably transmitted to a ground station for further processing. The processing on the ground can include object classification, orbit tracking (using a time sequence of differenced frames), and earth collision determination and warning.

BRIEF DESCRIPTION OF THE DRAWINGS

These and other objects, features and advantages of the invention will become better understood by reference to the following detailed description when considered in connection with the accompanying drawings wherein like reference numerals designate identical or corresponding parts throughout the several views and wherein.

DETAILED DESCRIPTION

Figure 1:
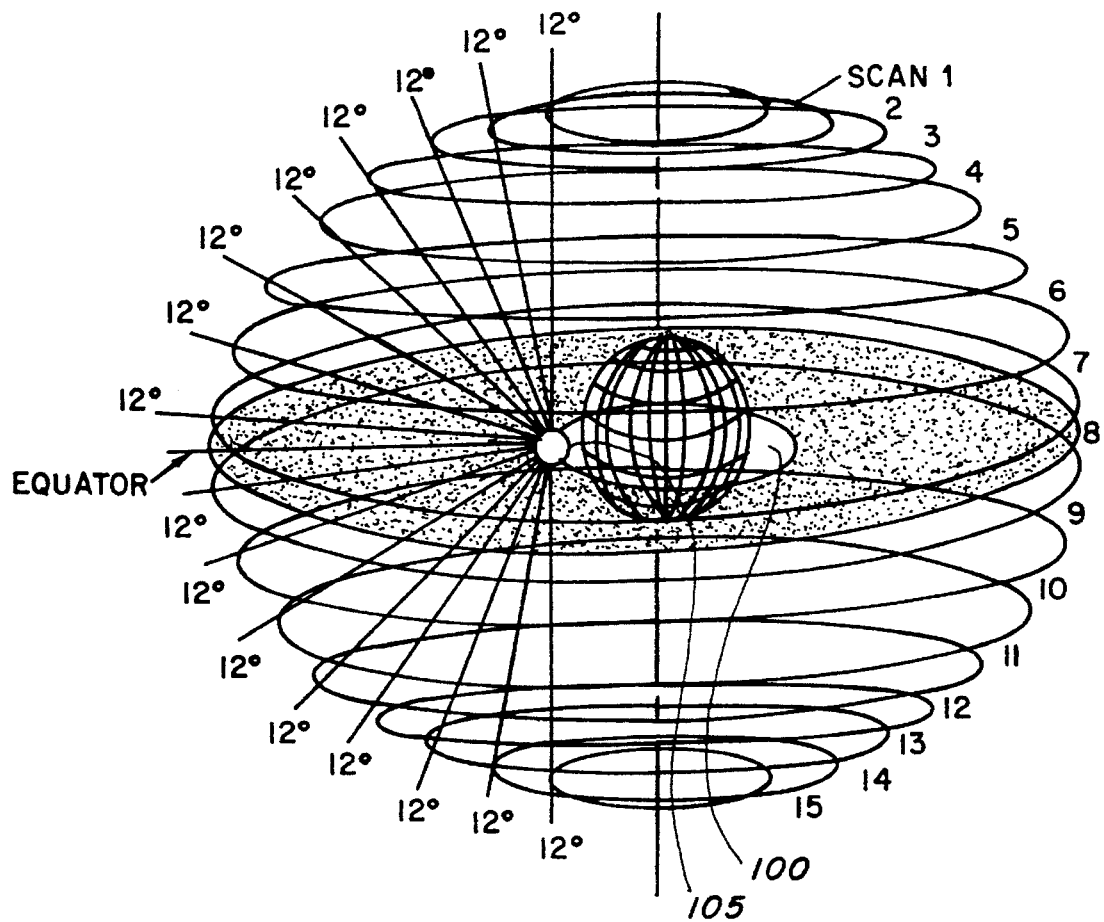
FIG. 1 shows an illustration of the use of a satellite-based scanning system to scan the celestial sphere about the earth.

Referring now to FIG. 1, there is shown an illustration of the use of a satellite-based scanning system of the present invention to scan the celestial sphere about the earth. In FIG.

1, satellite 105 containing an optical detector (not shown) orbits the earth along the circular orbital path 100. Satellite 105 has an exemplary altitude of 770 kilometers with a corresponding circular orbital time of 100 minutes per orbit. With this orbital time, satellite 105 completes 15 full revolutions around the earth every 24 hours. By scanning a different 12° of latitudinal width per orbit, satellite 105 will scan the entire celestial sphere daily.

In operation, satellite 105 continually orbits the earth along circular orbital path 100. In the first orbit, satellite 105 positions the optical detector such that the detector scans a 12 degree swath corresponding to scan 1 near the top of the celestial sphere as is shown in FIG. 1. With each successive orbit, the detector is stepped by 12 degrees compared to the previous scan, preferably by a conventional stepping motor (not shown). With this scan pattern the entire celestial sphere is scanned in 15 orbits (as shown in FIG. 1). After the fifteenth orbit, the detector is once again positioned to scan the swath at the top of the celestial sphere corresponding to scan 1.

Figure 2:
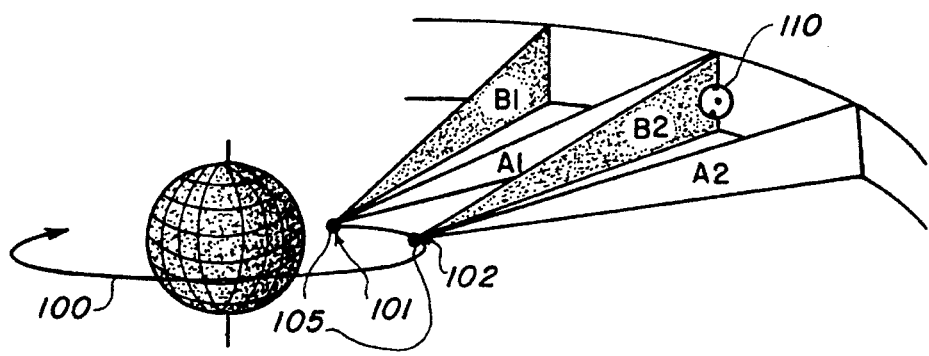
FIG. 2 shows an illustration of the use of parallax motion to detect near earth objects.

Referring now to FIG. 2, there is shown an illustration of the use of parallax motion to detect near earth objects. In FIG. 2, object 110 is a near earth object, such as a near earth asteroid or space debris, which is located at a distance from the earth that is greater than the altitude of the circular orbit 100 of satellite 105. Position 101 represents the position of satellite 105 at time t1, while position 102 represents the position of satellite 105 at a later time t2.

Satellite 105 contains a pair of detector arrays A and B (not shown), which image the celestial sphere as satellite 105 orbits the earth. Beams A1 and B1 represent the line of sight of detector arrays A and B at time t1, while beams A2 and B2 represent the line of sight of the two detector arrays at time t2. Detector arrays A and B are oriented so that the line of sight of the arrays (e.g. beams A1 and B1) are separated in azimuth by the same angle, thus the two arrays produce similar images separated by a slight delay. The length of the delay between the two beams is the time satellite 105 takes to travel the portion of the orbit equal to the angular separation of the two detector arrays. For example, a satellite having an altitude of 770 km (100 min/orbit) with beams A and B separated at each point in azimuth by 11.5 degrees will have a delay of about 3.2 minutes. That is, detector array B will image the portion of the sky that was imaged by detector array A 3.2 minutes earlier. The delay between the two images will result in parallax motion of near objects. The parallax angle is determined by the distance of the object and the angular separation of detector arrays A and B. A complete description of the operation of the detectors and the detection system is discussed below in reference to FIG. 3.

As satellite 105 orbits the earth, object 110 is in the line of sight A1 of detector A at time t1 and in the line of sight B2 of detector B at some later time t2. Because of the change in position of satellite 105 from position 101 to position 102, detector arrays A and B view object 110 at a different angle, and, depending on the distance of object 110, at a different location with respect to objects within the star field (not shown) which, because of the great distance at which the objects in the star field are located, do not exhibit detectable parallax motion. Thus, the images formed by the scans of detectors A and B show object 110 in different locations in the star field.

Figure 3:
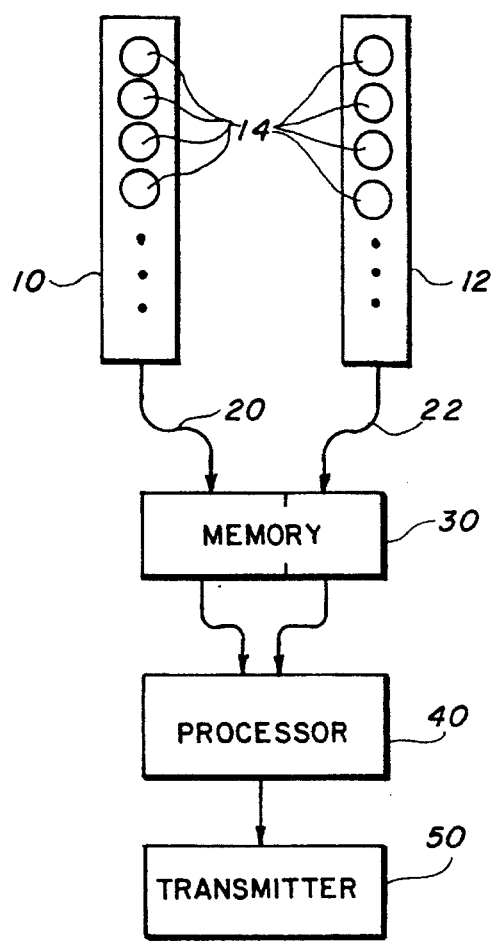
FIG. 3 is a schematic diagram of the detection system of the present invention.

This is shown more particularly in FIG. 3, in which is shown a schematic diagram of the detection system of the present invention. In FIG. 3, linear optical detector arrays 10 and 12 (corresponding to detector arrays A and B in FIG. 2) are used to scan the celestial sphere about the earth in the manner discussed above concerning FIG. 2. Each detector array (10 and 12) repeatedly images lines on the celestial sphere to build up a pair of images of the celestial sphere about the earth. Detector arrays 10 and 12 have an optically sensitive surface containing a linear array of opto-electric converters 14 each of which constitutes an image pixel. The pixel size and spacing determines the parallax angle resolution, and hence the maximum distance at which an object will be detected. Generally, the pixel size should be chosen to allow a one-pixel separation of maximally distant objects between images from detector arrays 10 and 12. In the example given above, each image pixel 14 has an instantaneous field of view (IFOV) of 0.05 milliradians. Thus, a linear array of pixels can be used to scan the 12 degree swaths discussed above in reference to FIG. 1.

Optical detector arrays 10 and 12 can be sensitive to wavelengths within the infrared or visible regions. However, because using visible light increases the distance at which NEAs can be detected, it is preferable that the detector arrays be sensitive in the visible wavelength region (near 0.75 μm).

Outputs 20 and 22 of detectors 10 and 12, respectively, are connected to memory means 30 which temporarily stores the output of detectors 10 and 12 until the images are used by processor 40. Processor 40 compares the images produced by detectors 10 and 12 to identify objects within the images which have exhibited a change in position relative to other objects in the image using common frame difference signal processing (FDSP) techniques. The results from processor 40 are sent to transmitter 50 which downloads the output of processor 40 to a ground station for further processing.

In operation, as detector arrays 10 and 12 progress about the earth, each array repeatedly images the sky and stores the images pixel by pixel. In this manner, each detector array 10 and 12 sweeps out a two dimensional image of a selected portion of the sky, each image being the same, but out of phase by the time ΔT it takes for satellite 105 to travel a distance equal to the azimuthal spacing between the two detector arrays. (By azimuthal, it is meant an angular direction parallel to the orbit of satellite 105.) The example given above with an altitude of 770 kilometers (100 min/orbit), as discussed above in reference to FIGS. 1 and 2, will be used in this discussion. Detectors 10 and 12 scan the celestial sphere as the satellite orbits the earth. Detectors 10 and 12 are oriented such that the detectors will image lines on the celestial sphere separated at each pixel in azimuth by the same angle. Irradiance from NEAs as well as other objects within the celestial sphere illuminate optical detectors 10 and 12. Each opto-electric converter 14 creates electronic data proportional to the intensity of the light received. Thus, the optical images of lines on the celestial captured by detectors 10 and 12 are converted into electronic data that are capable of subsequent reading and processing.

Each converter 14 in detector 10 (or 12) can have an associated charge coupled device (CCD) element which receives a charge proportional to the intensity of light at the converter. The CCD element can be read to provide an output value corresponding to the charge received at the element. The CCD elements can be read serially providing at output 20 (or 22) a single string of output values or the CCD's can be read in parallel such that all the CCD elements are read simultaneously providing a plurality of output 20 (or 22) connections with each individual output 20 (or 22) containing a single output value from a single CCD. Similarly, converter 14 in detector 10 (or 12) can be a phototransistor. The phototransistor will produce a response, such as a current gain, proportional to the amount of light received. The size of the response produced by the phototransistor can be used to provide an output value that corresponds to the intensity of light received at the phototransistor. Similarly, the output 20 (or 22) from detector 10 (or 12) comprised of phototransistors can be read serially or in parallel.

For the exemplary satellite of this discussion, outputs 20 and 22 from detectors 10 and 12 are read into memory 30 every 50 milliseconds. Thus, memory 30 contains a pair of time sequence images of lines on the celestial sphere. The amount of memory needed to store the images produced by detectors 10 and 12 can be calculated as follows:

$$N_s(\Delta T + 2\Delta t)$$

where $N_s$ is the sample rate collected by a single detector; $\Delta T$ is the time delay between linear arrays 10 and 12; and $\Delta t$ is the time increment large enough to allow registration of the partial images. Using a detector length of 4096 pixels, sampling every 50 msec., a delay time of 3.2 minutes, an image width of 128 samples, and 3 times over sampling, the storage capacity (assuming 2 byte/sample) required for the two images is 100 Mbytes.

As mentioned above, processor 40 differences the two images to reveal parallax motion of near objects. Differencing per se is well known, and essentially requires registration of the images, generally including displacement estimation and interpolation of pixels to obtain a better fit of one image to another, and finally a pixel by pixel subtraction of the registered images to one another. Registration and interpolation of images are per se well known. One could use, for example, any of a large number of known techniques for determining the displacement between images such as Phase Correlation (PC) or Image Displacement Estimation Algorithm (IDEA). The interpolation can likewise be accomplished by any of several common methods such as Linear Interpolation, Spline Interpolation, Phase Shifting, Cubic Convolution, or Dual Difference Filtering. (More details of Dual Difference Filtering is given in, Schaum, *Dual Difference Filtering: A Replacement for Interpolation and Subtraction to Detect Changes in Misregistered Signals*, Naval Research Laboratory Report NRL/FR/5620-92-9522, Nov. 30, 1992, a copy of which is filed with this application, and incorporated herein by reference.)

In the resultant difference frame, or difference image, fixed objects such as objects in the star field subtract to zero, while near earth objects exhibiting parallax motion will appear as dipoles (positive-negative pairs). Thus, near earth objects are tracked by using the parallax motion of the objects as a discriminant.

The results of the frame difference signal processing by processor 40 are sent to transmitter 50. Transmitter 50 downloads the results from the FSDP of processor 40 to a ground station for further processing. The processing on the ground can include object classification, orbit tracking (using a time sequence of differenced frames), and earth collision determination and warning.

Figure 4:
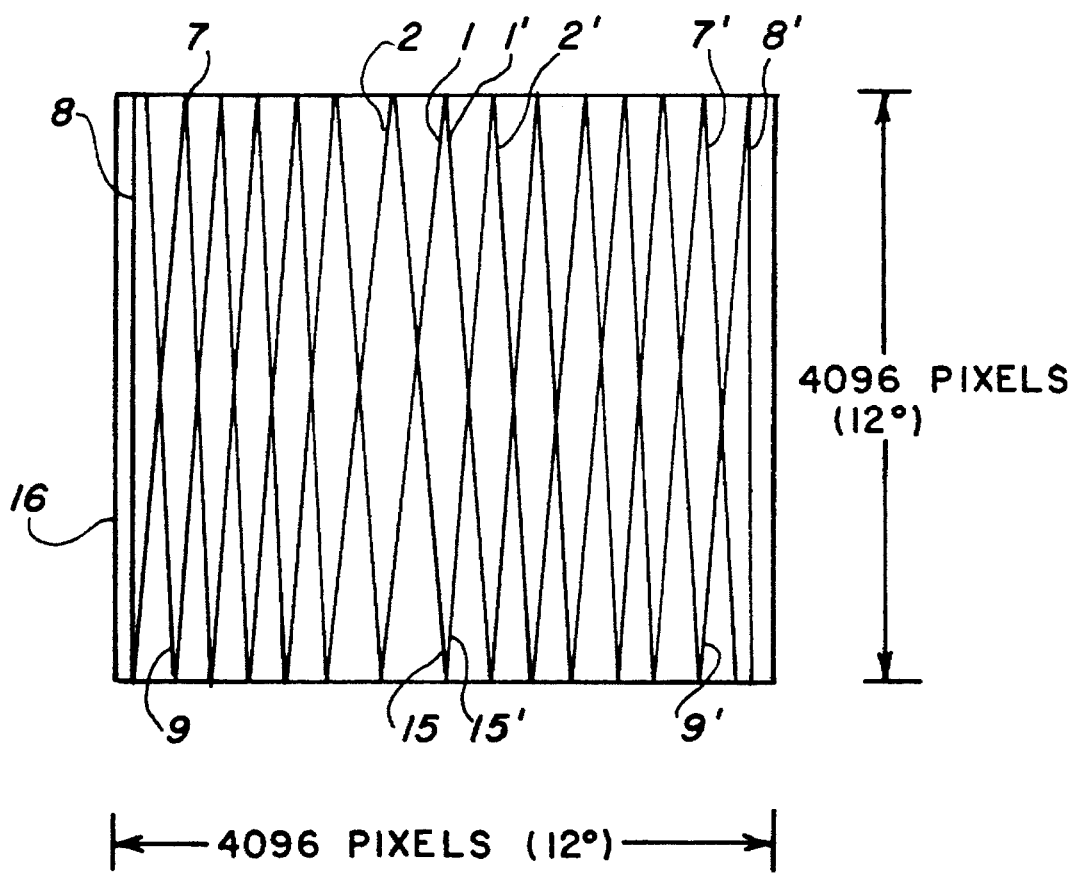
FIG. 4 is an illustration of the selection of two individual linear arrays from a single two dimension planar detector array.

In FIG. 4, detector array 16 has an optically sensitive surface containing a two dimensional planar array of opto-electric converters (not shown) each of which constitutes an image pixel. The linear detector arrays, such as detector arrays 10 and 12 of FIG. 3 or detectors A and B of FIG. 2, are electronically selected from the two dimensional detector array 16. Lines 1 and 1' represent the linear array selection for detector arrays 10 and 12 for scan 1. The linear array selection for successive scans are represented in the same manner (e.g. 2 and 2' for scan 2). The separation between corresponding pixels in the two arrays depends on the elevation, from the orbital plane, of the scan. Different lines of pixels are needed for different scans to accommodate scanning different latitudes: the inclination of the pixel lines is chosen so that they lie generally along lines of earth longitude.

The field of view of detector array 16 should be large enough to cover the size of each scan associated with an orbit of the satellite. For example, using an exemplary satellite having a altitude of 770 km and an orbital period of 100 min/orbit, the satellite completes 15 full orbits each with each orbit scanning a 12 degree swath (as discussed above in FIG. 1), the field of view of detector array 16 should be 12 degrees. If each pixel of detector array 16 has an instantaneous field of view of 0.05 milliradians, 4096 total pixels in a square array give the array an adequate field of view (i.e. at least 12°).

In operation, detector array 16 is mounted on a satellite orbiting the earth. The satellite orbits the earth with detector array 16 positioned to scan a different portion of the celestial sphere with each orbit. Assuming the satellite uses a scan pattern as described above in reference to FIG. 1, scan 1 uses a pair of bars, lines 1 and 1', forming an inverted "V" shape as shown in FIG. 4. Successive scans uses pairs separated more and more until scan 8. Scan 8, which corresponds to the scan of the orbital plane of the satellite, uses a pair of parallel lines (lines 8 and 8') at the edge of detector array 16. As the satellite begins to scan portions of the celestial sphere having an elevation below the orbital plane of the satellite, scans 9 through 15 work back towards the center. Scan 15 uses lines 15 and 15' forming the central "V" shaped pair.

Although the foregoing has discussed an imaging system orbiting the earth, the invention could also be practiced at bodies other than the earth. More broadly, the many features and advantages of the present invention are apparent from the detailed specification and thus it is intended by the appended claims to cover all such features and advantages of the invention which follow in the true spirit and scope thereof. Further, since numerous modifications and changes will readily occur to those skilled in the art, it is not desired to limit the invention to the exact construction and operation illustrated and described, and accordingly all suitable modifications and equivalence may be resorted to as falling within the scope of the invention.

What is claimed is:

1. An apparatus for detecting bodies near a celestial object, said apparatus comprising:

means, disposed in orbit about said celestial object, for forming a first and a second image of at least a portion of the celestial sphere about said celestial object, said means for forming adapted to permit forming said second image at a time after said forming of said first image; and means for differencing said first and second images to produce a resultant image, said means for differencing comprising means for registering said first and said second image prior to said differencing.

2. The apparatus of claim 1 wherein:

said means for forming is a two dimensional array of optical elements.

3. The apparatus of claim 1 wherein:

said means for differencing is disposed in orbit about said celestial body; and said apparatus further comprises means for transmitting said resultant image effective for reception on said celestial object.

4. An apparatus for detecting bodies near a celestial object, said apparatus comprising:

means, disposed in orbit about said celestial object, for forming a first and a second image of at least a portion of the celestial sphere about said celestial object, said means for forming adapted to permit forming said second image at a time after said forming of said first image; and means for differencing said first and second images to produce a resultant image;

wherein:

said means for imaging is a pair of linear optical arrays, the elements of said arrays being generally disposed transverse to the orbital plane.

5. An apparatus for detecting bodies near a celestial object, said apparatus comprising:

means, disposed in orbit about said celestial object, for forming a first and a second image of at least a portion of the celestial sphere about said celestial object, said means for forming adapted to permit forming said second image at a time after said forming of said first image; and means for differencing said first and second images to produce a resultant image;

wherein said means for forming comprises:

a two dimensional array of optical elements; and means for enabling and disenabling selected elements of said array effective to cause only two selected lines of array elements to be active, said two selected lines of array elements being effective, respectively, to form said first and said second images.

6. A method for detecting bodies near a celestial object, including steps for:

placing a means for imaging into orbit about said celestial object;

using said means for imaging to form a first image of at least a portion of the celestial sphere about said object, and at a time thereafter, using said means for imaging to form a second image of said portion of said celestial sphere; and differencing said first and second images to produce a resultant image, said means for differencing comprising means for registering said first and said second image prior to said differencing.

7. The method of claim 6 wherein said means for imaging is a two dimensional array of optical elements.

8. The method of claim 6 wherein:

said differencing is performed in orbit; and said resultant image is transmitted effective for reception on said celestial object.

9. A method for detecting bodies near a celestial object, including steps for:

placing a means for imaging into orbit about said celestial object;

using said means for imaging to form a first image of at least a portion of the celestial sphere about said object, and at a time thereafter, using said means for imaging to form a second image of said portion of said celestial sphere; and differencing said first and second images to produce a resultant image wherein:

said means for imaging is a pair of linear optical arrays, the elements of said arrays being generally disposed parallel to lines of longitude of said celestial object.

10. A method for detecting bodies near a celestial object, including steps for:

placing a means for imaging into orbit about said celestial object;

using said means for imaging to form a first image of at least a portion of the celestial sphere about said object, and at a time thereafter, using said means for imaging to form a second image of said portion of said celestial sphere; and differencing said first and second images to produce a resultant image; wherein:

said means for imaging is a two dimensional array of optical elements; and said step for using further comprises enabling and disenabling selected elements of said array effective to cause only two selected lines of array elements to be active, said two selected lines of array elements being effective, respectively, to form said first and said second images.

* * * * *